United States Patent
Augustyniak

(10) Patent No.: US 7,152,898 B2
(45) Date of Patent: Dec. 26, 2006

(54) SYSTEM AND METHOD FOR REDUCING VEHICLE NOISE

(75) Inventor: Alan Henry Augustyniak, Waterford, MI (US)

(73) Assignee: Lear Corporation, Southfield, MI (US)

( * ) Notice: Subject to any disclaimer, the term of this patent is extended or adjusted under 35 U.S.C. 154(b) by 71 days.

(21) Appl. No.: 10/905,469

(22) Filed: Jan. 6, 2005

(65) Prior Publication Data

US 2006/0145504 A1 Jul. 6, 2006

(51) Int. Cl.
*B60N 3/12* (2006.01)
(52) U.S. Cl. .................... 296/37.12; 16/273; 296/37.8
(58) Field of Classification Search ........... 296/37.12, 296/37.8; 16/382, 308, 260, 261, 273, 385
See application file for complete search history.

(56) References Cited

U.S. PATENT DOCUMENTS

| | | | | |
|---|---|---|---|---|
| 4,329,758 A | * | 5/1982 | Fohl | 16/273 |
| 4,552,399 A | * | 11/1985 | Atarashi | 296/37.12 |
| 4,630,332 A | * | 12/1986 | Bisbing | 16/273 |
| 4,883,319 A | * | 11/1989 | Scott | 297/354.1 |
| 4,886,311 A | | 12/1989 | Trube et al. | |
| 4,964,193 A | * | 10/1990 | Rommelfaenger et al. | 16/385 |
| 5,190,314 A | | 3/1993 | Takasugi | |
| 5,197,775 A | * | 3/1993 | Reeber | 296/37.12 |
| 5,275,456 A | | 1/1994 | Ishii et al. | |
| 5,452,501 A | * | 9/1995 | Kramer et al. | 16/273 |
| 5,516,177 A | | 5/1996 | Levely | |
| 5,630,630 A | * | 5/1997 | Price et al. | 292/128 |
| 5,652,694 A | * | 7/1997 | Martin | 16/342 |
| 5,722,684 A | * | 3/1998 | Saderholm et al. | 280/728.3 |
| 5,732,994 A | * | 3/1998 | Stancu et al. | 296/37.8 |
| 5,845,954 A | | 12/1998 | DePue | |
| 5,868,448 A | | 2/1999 | Izumo | |
| 5,904,389 A | * | 5/1999 | Vaishnav et al. | 296/37.12 |
| 5,971,461 A | * | 10/1999 | Vaishnav et al. | 296/37.12 |
| 6,076,878 A | | 6/2000 | Isano | |
| 6,081,966 A | * | 7/2000 | Antekeier et al. | 160/201 |
| 6,106,043 A | | 8/2000 | Izumo | |
| 6,244,647 B1 | * | 6/2001 | Allison | 296/37.12 |
| 6,276,737 B1 | * | 8/2001 | Cansfield et al. | 296/37.8 |
| 6,381,809 B1 | * | 5/2002 | Uneme et al. | 16/385 |
| 6,405,408 B1 | * | 6/2002 | Mavrofrides | 296/37.9 |
| 6,637,096 B1 | | 10/2003 | Kang | |
| 6,662,405 B1 | * | 12/2003 | Vitry | 16/355 |
| 6,732,408 B1 | * | 5/2004 | Wu | 16/273 |
| 6,749,242 B1 | * | 6/2004 | Park | 296/37.12 |
| 6,799,785 B1 | | 10/2004 | Davis, Jr. | |
| 6,817,062 B1 | * | 11/2004 | Cho | 16/328 |
| 6,832,412 B1 | * | 12/2004 | Kim | 16/354 |

(Continued)

*Primary Examiner*—Kiran B. Patel
(74) *Attorney, Agent, or Firm*—Bir Law, PLC; David S. Bir

(57) ABSTRACT

A system and method for reducing or eliminating noise generated in a vehicle by contact between components of similar or identical materials isolate the components using a dissimilar material disposed between the components of similar or identical materials. An isolator made of a second material, such as a thermoplastic polyolefin (TPO) is disposed between a glovebox hinge retainer and glovebox door hinge made of a first material that provides desired structural characteristics for an instrument panel assembly, such as acrylonitrile butadiene styrene (ABS) or polycarbonate/ acrylonitrile butadiene styrene (PC/ABS). The glovebox hinge retainer may be integrally formed with the instrument panel with the isolator comprising an integrally formed projection in a glovebox surround that extends between at least one side of the hinge retainer and the glovebox door hinge after installation of the glovebox door.

17 Claims, 2 Drawing Sheets

U.S. PATENT DOCUMENTS

| | | |
|---|---|---|
| 6,886,222 B1 * | 5/2005 | Vitry .......................... 16/352 |
| 2003/0129418 A1 | 7/2003 | Tamura |
| 2004/0000737 A1 | 1/2004 | Durr |
| 2004/0025296 A1 * | 2/2004 | Wade .......................... 16/273 |
| 2005/0133507 A1 * | 6/2005 | Tanaka ........................ 220/263 |

* cited by examiner

SYSTEM AND METHOD FOR REDUCING VEHICLE NOISE

FIELD OF THE INVENTION

The present invention relates to a system and method for reducing noise associated with interior vehicle components.

BACKGROUND ART

Vehicle component suppliers and manufacturers continually attempt to improve vehicle occupant safety while providing aesthetically pleasing accessories and convenient vehicle amenities. Numerous compartments for storing personal items are often provided, typically including a glovebox or glove compartment with a hinged door attached to the passenger side of the instrument panel. Manufacturers are continually examining new materials, designs, and assembly procedures for various instrument panel components to meet consumer demand for aesthetically pleasing and functional features, reduce costs, and maintain or improve occupant safety. Use of similar or identical materials that provide desired structural characteristics for components that may contact each other may result in undesirable buzz, rattles, squeaks, or other noise during operation of the vehicle. In particular, use of materials such as polycarbonate/acrylonitrile butadiene styrene (PC/ABS) or similar materials to provide desirable structural characteristics for various components of a vehicle instrument panel may result in undesirable buzz, squeaks, or rattles (BSR).

SUMMARY OF THE INVENTION

The present invention includes a system and method for reducing or eliminating noise generated in a vehicle by contact between components of similar or identical materials that isolate the components using a dissimilar material disposed between the components of similar or identical materials.

In one embodiment, the invention includes a glovebox hinge retainer and glovebox door hinge made of a first material and an isolator made of a second material disposed between the glovebox hinge retainer and the glovebox door hinge. The first material may be PC/ABS or a similar material to provide desired structural characteristics with the second material being a thermoplastic polyolefin (TPO) such as polypropylene (PP) or similar material. The glovebox hinge retainer may be integrally formed in the instrument panel with the isolator comprising an integrally formed projection in a glovebox surround that extends between at least one side of the hinge retainer and the glovebox door hinge when installed. The glovebox surround may be secured to the instrument panel using one or more conventional fasteners. A hinge pin may be used to secure the glovebox door hinge to the hinge retainer to allow opening and closing of the glovebox door.

Other embodiments of the present invention include a method for reducing or eliminating noise in a vehicle interior by positioning an isolator between a glovebox door hinge and hinge retainer, the isolator being made of a different or dissimilar material than the glovebox door hinge and hinge retainer.

The present invention provides a number of advantages. For example, the present invention allows use of materials having desired structural characteristics while reducing or eliminating noise associated with contact between components made of a similar or identical material. Various embodiments of the present invention provide for an integrally formed or molded isolator so that additional parts and assembly are not required to eliminate noise. In addition, an integrally formed isolator reduces tolerancing and stack-up requirements that would otherwise be associated with separate or discrete parts required to reduce or eliminate noise.

The above advantages and other advantages and features of the present invention will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the present invention as illustrated and described with reference to any one of the Figures may be combined with features illustrated in one or more other Figures to produce embodiments of the present invention that are not explicitly illustrated or described. The combinations of features illustrated provide representative embodiments for typical applications. However, various combinations and modifications of the features consistent with the teachings of the present invention may be desired for particular applications or implementations.

Figure 1:
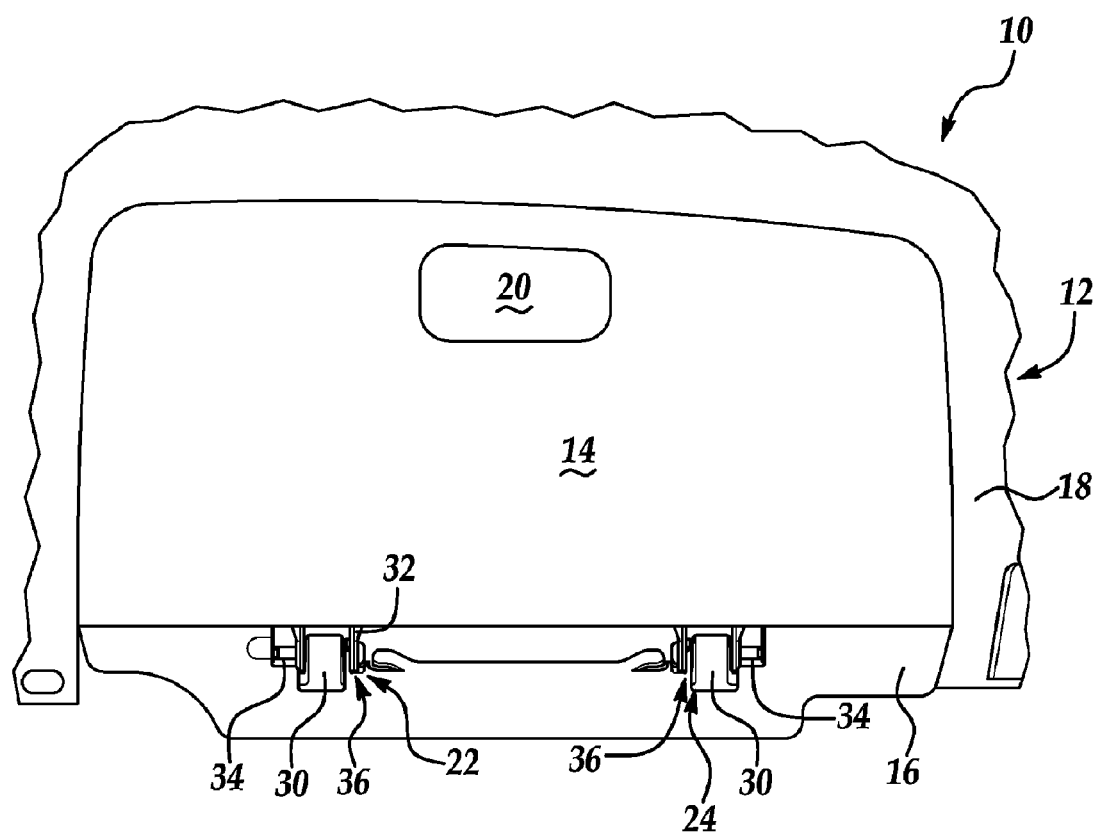
FIG. 1 is a cutaway view of an instrument panel or dashboard in a system for reducing interior noise in a vehicle according to one embodiment of the present invention.

FIG. 1 illustrates a representative application for a system or method for reducing vehicle interior noise according to one embodiment of the present invention. System 10 includes a vehicle interior assembly 12 having a storage compartment, such as a glovebox or glove compartment, with an associated access door 14 secured to a surround or closeout 16, which is secured to an instrument panel or dashboard 18. Door 14 preferably includes an appropriate handle and latching mechanism generally represented by reference numeral 20 to facilitate opening and closing. In this embodiment, glovebox door 14 is secured to instrument panel 18 by one or more hinge assemblies 22, 24. Each hinge assembly 22, 24 includes a hinge retainer 30 that may be integrally formed or molded in instrument panel 18, or provided as a separate component secured to the instrument panel depending upon the particular application and implementation. However, those of ordinary skill in the art will recognize various advantages associated with having an integrally molded or formed hinge retainer. Integrally formed hinge retainer 30 projects through a corresponding aperture or hole in glovebox surround 16 and includes an appropriate hole or aperture for receiving a hinge pin. During assembly, glovebox hinge 32 is secured to hinge retainer 30 by hinge pin 34. According to the present invention, an isolator 36 extends along at least one side of each hinge retainer 30 to isolate glovebox hinge 32 from hinge retainer 30, i.e. to reduce or prevent contact between hinge retainer 30 and glovebox hinge 32. Although the representative application illustrated includes two hinge assemblies, the present invention applies equally to applications and implementations having a single hinge assembly or multiple hinge assemblies.

In various vehicle applications, glovebox door 14 and instrument panel 18 may be made of a similar or identical material to provide desired structural characteristics. For example, glovebox door 14 and instrument panel 18 may be made of acrylonitrile butadiene styrene (ABS) or polycarbonate/acrylonitrile butadiene styrene (PC/ABS), which have desired structural characteristics for various vehicle applications. Contact between components made of these types of materials may result in undesirable interior noise during vehicle operation, often referred to as buzz, rattles, or squeaks (BSR), etc. According to the present invention, isolator 36 is made of a second material, such as a thermoplastic polyolefin (TPO), to reduce or eliminate contact between components of similar or identical material and the resulting undesirable noise. In one embodiment, isolator 36 extends radially about halfway around hinge pin 34 on one side of each hinge retainer 30 and is integrally formed or molded in glovebox surround or closeout 16. Isolator 36 and glovebox surround 16 are made of a TPO, such as polypropylene in this embodiment, to effectively isolate contact between glovebox hinge 32 and hinge retainer 30, which are made of a material to provide desired structural characteristics, such as PC/ABS.

Figure 2:
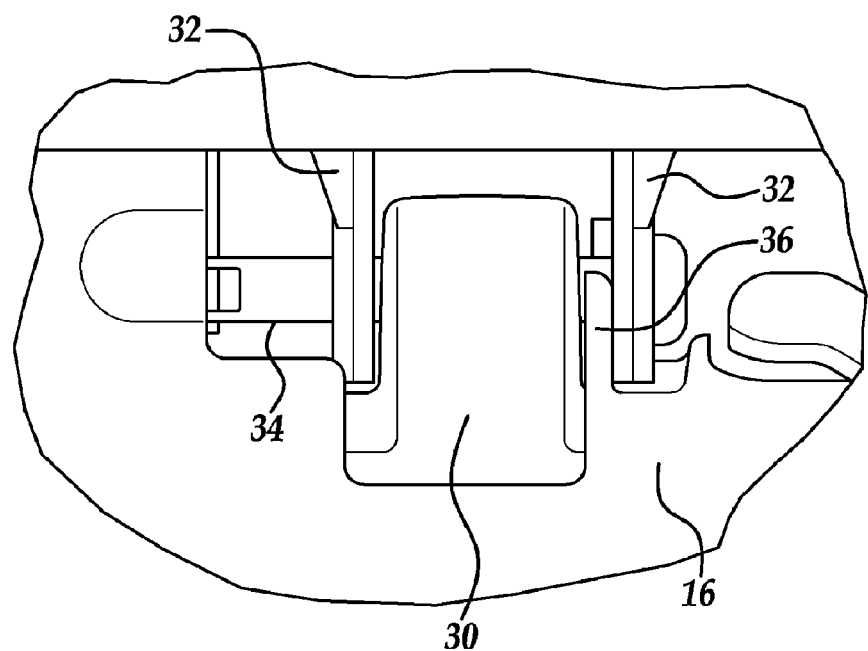
FIG. 2 is a close-up view of a glovebox hinge and hinge retainer with an integrally formed isolator according to one embodiment of the present invention.

FIG. 2 is a close-up view of a glovebox hinge and hinge retainer with an integrally formed isolator according to one embodiment of the present invention. Hinge retainer 30 extends through a corresponding aperture in glovebox closeout or surround 16, which includes an integrally formed or molded isolator 36 of unitary construction. In this embodiment, isolator 36 is implemented by a U-shaped extension or rib that extends radially about halfway around hinge pin 34. To provide the desired isolation between glovebox hinge 32 and corresponding hinge retainer 30, isolator 36 is provided along the inside edge of each hinge retainer 30. Depending upon the particular application, isolator 36 may be provided as a separate component and/or may be provided both sides of each hinge retainer 30. However, those of ordinary skill in the art will recognize various advantages associated with having an integrally formed or molded isolator 36. In particular, an integrally formed or molded isolator 36 reduces assembly operations and assures that the isolator is present in every assembly without an additional quality assurance inspection or check. Positioning of isolator 36 on either the inside or outside of hinge retainers 30 provides additional clearance and reduces tolerancing requirements for the opening in glovebox surround 16 associated with hinge retainer 30 while providing the desired isolation to reduce or eliminate noise that may be generated by contact between retainer 30 and hinge 32.

Figure 3:
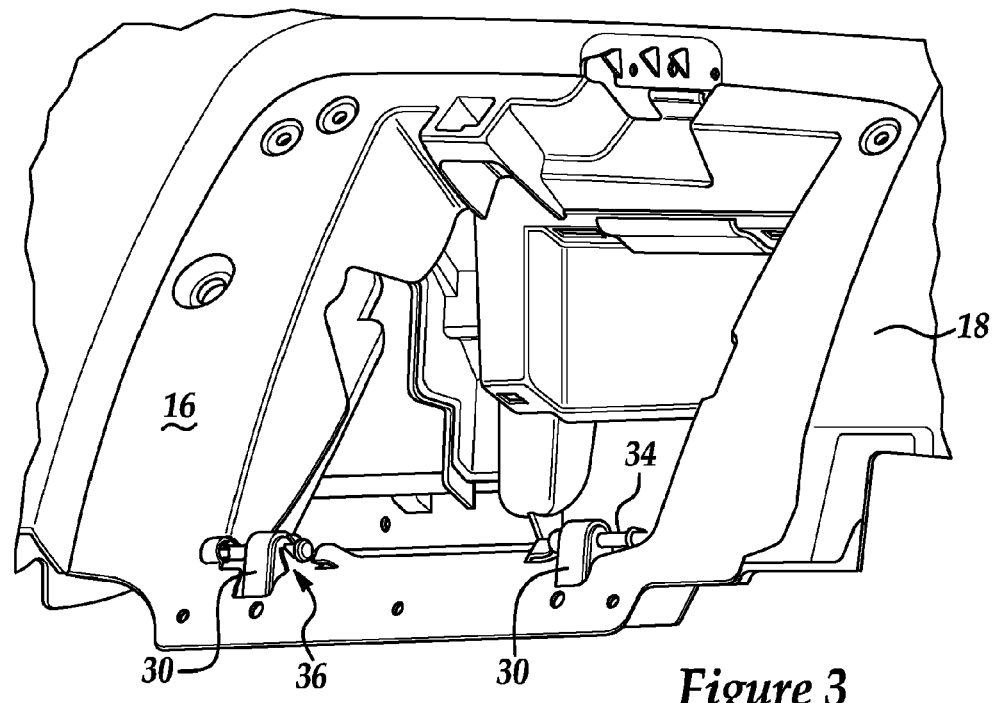
FIG. 3 illustrates a glovebox surround and instrument panel in a system or method for reducing interior noise according to one embodiment of the present invention.

FIG. 3 illustrates a glovebox surround and instrument panel in a system or method for reducing interior noise according to one embodiment of the present invention. Instrument panel 18 is made of a first material having desired structural properties or characteristics and includes an opening for installation of a storage compartment, such as a glovebox or glove compartment. Instrument panel 18 includes at least one integrally formed hinge retainer 30 having a hole for receiving a hinge pin to secure a glovebox door. Glovebox surround 16 is made of a second material and extends into the opening for the storage compartment or glovebox of instrument panel 18. Glovebox surround or closeout 16 is secured to instrument panel 18 using conventional fasteners or other commercial fastening methods. As illustrated, glovebox surround 16 includes openings or cutouts corresponding to each hinge retainer 30 so that the hinge retainers project through the associated cut-outs when surround 16 is secured to instrument panel 18. Glovebox surround 16 includes at least one integrally formed or molded isolator 36 extending at least partially along at least one side of each hinge retainer 30. A glovebox door having at least one hinge cooperating with hinge retainers 30 may then be secured to hinge retainer 30 by one or more associated hinge pins 34.

Figure 4:
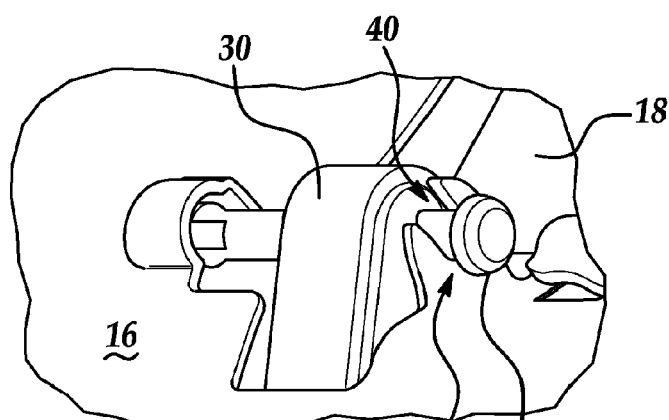
FIG. 4 is a close-up illustrating an isolator extending along a hinge retainer according to one embodiment of the present invention.

FIG. 4 is a close-up illustrating an isolator extending alongside a hinge retainer according to one embodiment of the present invention. As illustrated in this embodiment, isolator 36 comprises an integrally formed projection extending from glovebox surround 16 along an opening that accommodates hinge retainer 30, which is integrally formed in the instrument panel. Isolator 36 includes an open ended, U-shaped or open end construction 40 to facilitate assembly while providing the desired isolation between hinge retainer 30 and a glovebox door hinge (not shown). Isolator 36 extends radially about halfway or about 180° around hinge pin 34.

Figure 5:
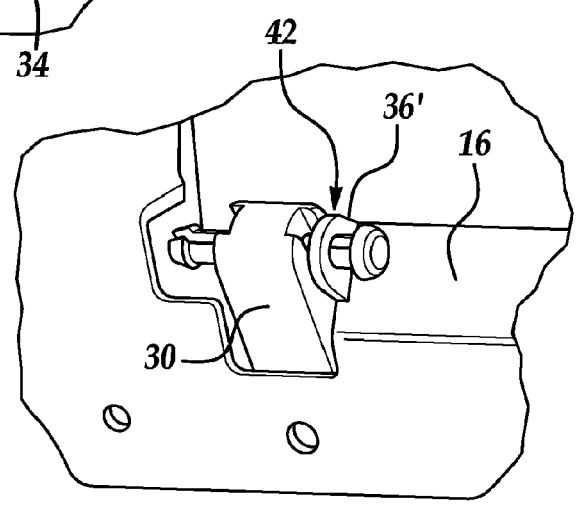
FIG. 5 illustrates an alternative implementation of an isolator for use in a system or method for reducing interior noise according to one embodiment of the present invention.

FIG. 5 illustrates an alternative implementation of an isolator for use in a system or method for reducing interior noise according to one embodiment of the present invention. In the embodiment of FIG. 5, integrally formed isolator 36' includes a projection or rib extending along an opening for a hinge retainer 30 having a closed end construction 42 with an associated through hole to accommodate a hinge pin to secure a glovebox door to hinge retainer 30.

As illustrated and described with reference to FIGS. 1–5 a method for reducing interior noise associated with an instrument panel having a glovebox door hinge and hinge retainer made of a first material includes positioning an isolator made of a second material between at least one side of each glovebox door hinge and corresponding glovebox hinge retainer. In one embodiment, the isolators are positioned by securing a glovebox surround to the instrument panel where the glovebox surround includes openings to accommodate the hinge retainers of the instrument panel and integrally molded isolators associated with each opening such that the isolators extend between the hinge retainers and the associated glovebox door hinge after assembly or installation. The isolators may extend about halfway around a corresponding hinge pin that extends through the glovebox door hinge and corresponding hinge retainer to form a U-shaped extension or rib. Alternatively, the isolators may include a closed end or projection having a through hole to accommodate the associated hinge pin.

As such, the present invention allows use of materials having desired structural characteristics for typical vehicle applications while reducing or eliminating noise associated with contact between components made of a similar or identical material. Various embodiments of the present invention provide for an integrally formed or molded isolator so that additional parts and assembly are not required to eliminate noise. In addition, an integrally formed isolator reduces tolerancing and stack-up requirements that would otherwise be associated with separate or discrete parts required to reduce or eliminate noise.

While the best mode for carrying out the invention has been described in detail, those familiar with the art to which this invention relates will recognize various alternative designs and embodiments for practicing the invention as defined by the following claims.

What is claimed is:

1. A system for reducing interior noise in a vehicle, the system comprising:
an instrument panel having an opening for installation of a storage compartment with an access door, the instrument panel including at least one hinge retainers made of a first material;
the access door for the storage compartment having at least one hinge cooperating with the at least one hinge retainers and pivotally secured thereto via a corresponding hinge pin to allow opening and closing of the access door, the access door and at least one hinge being made of the first material; and
an isolator disposed between at least one side of the at least one hinge and a corresponding side of an associated hinge retainer, the isolator being made of a second material to reduce noise otherwise generated by contact between the hinge and the hinge retainer.

2. The system of claim 1 further comprising a storage compartment surround made of the second material, the storage compartment surround being inserted into the opening before installation of the access door, wherein the isolator is integrally formed in the storage compartment surround.

3. The system of claim 2 wherein the isolator includes an aperture for receiving the hinge pin.

4. The system of claim 2 wherein the isolator extends only about halfway around the hinge pin.

5. The system of claim 1 wherein the first material comprises acrylonitrile butadiene styrene and the second material comprises a thermoplastic polyolefin.

6. The system of claim 1 wherein the first material comprises polycarbonate/acrylonitrile butadiene styrene and the second material comprises a thermoplastic polyolefin.

7. The system of claim 6 wherein the second material comprises polypropylene.

8. The system of claim 1 wherein the storage compartment comprises a glovebox and wherein the access door comprises a glovebox door.

9. The system of claim 1 wherein the at least two hinge retainers are integrally molded into the instrument panel.

10. A method for reducing interior noise associated with an instrument panel having a glovebox door hinge and hinge retainer made of a first material, the hinge rotating relative to the retainer to allow the glovebox door to open and close, the method comprising:
positioning an isolator made of a second material between at least one side of each glovebox door hinge and a corresponding glovebox hinge retainer to reduce noise generated from contact between the hinge and corresponding retainer, wherein the isolator is fixed relative to the instrument panel.

11. The method of claim 10 wherein the step of positioning an isolator made of a second material comprises:
securing a glovebox surround to the instrument panel, the glovebox surround including integrally molded isolators that extend 4 least partially between the glovebox door hinge and corresponding binge retainer.

12. The method of claim 11 wherein the isolators extend about halfway around a corresponding hinge pin that extends through the glovebox door hinge and corresponding binge retainer.

13. The method of claim 10 wherein the hinge retainer is integrally molded in the instrument panel.

14. A vehicle interior assembly comprising:
an instrument panel made of a first material and having an opening for a glovebox, the instrument panel including at least one integrally formed hinge retainer having a hole for receiving a hinge pin to secure a glovebox door;
a glovebox surround made of a second material extending into the opening for the glove box and secured to the instrument panel, the surround having a cut-out corresponding to each integrally formed hinge retainer so that the hinge retainer projects through the cut-out when the surround is secured to the instrument panel, the surround including at least one integrally formed isolator extending at least partially along at least one side of each hinge retainer; and
a glovebox door having at least one hinge cooperating with the at least one hinge retainer and isolator to pivotally secure the glovebox door with a hinge pin that extends through the hinge, isolator, and hinge retainer.

15. The assembly of claim 14 wherein the first material comprises an acrylonitrile butadiene styrene and the second material comprises a thermoplastic polyolefin.

16. The assembly of claim 14 wherein the at least one integrally formed isolator extends about half way around an associated hinge pin.

17. The assembly of claim 14 wherein the at least one isolator includes a hole to accommodate an associated hinge pin.

* * * * *